(12) United States Patent
Poellmann et al.

(10) Patent No.: US 7,462,660 B2
(45) Date of Patent: Dec. 9, 2008

(54) COPOLYMERS CONTAINING STYRENE OXIDE AND USE THEREOF AS EMULSIFIERS AND DISPERSING AGENTS

(75) Inventors: Klaus Poellmann, Burghausen (DE); Martin Glos, Muehldorf (DE); Anton Strasser, Altoetting (DE); Eckart Kraemer, Wiesbaden (DE)

(73) Assignee: Lariant Produkte (Deutschland) GmbH, Sulzbach (DE)

( * ) Notice: Subject to any disclaimer, the term of this patent is extended or adjusted under 35 U.S.C. 154(b) by 576 days.

(21) Appl. No.: 10/535,020

(22) PCT Filed: Oct. 30, 2003

(86) PCT No.: PCT/EP03/12043

§ 371 (c)(1),
(2), (4) Date: May 12, 2005

(87) PCT Pub. No.: WO2004/044035

PCT Pub. Date: May 27, 2004

(65) Prior Publication Data

US 2006/0058429 A1 Mar. 16, 2006

(30) Foreign Application Priority Data

Nov. 12, 2002 (DE) ................. 102 52 452

(51) Int. Cl.
*C08L 95/00* (2006.01)
(52) U.S. Cl. ..................... 524/59; 524/800
(58) Field of Classification Search ........... 524/59, 524/800
See application file for complete search history.

(56) References Cited

U.S. PATENT DOCUMENTS

| | | | |
|---|---|---|---|
| 5,324,862 A | 6/1994 | Yokota |
| 5,332,854 A | 7/1994 | Yokota |
| 6,310,123 B1 | 10/2001 | Boinowitz |
| 6,552,091 B1 | 4/2003 | Boinowitz |
| 6,689,731 B2 | 2/2004 | Esselborn |

FOREIGN PATENT DOCUMENTS

| | | |
|---|---|---|
| CA | 2006424 | 12/1990 |
| EP | 0107946 | 5/1984 |
| JP | 49-49198 | 12/1974 |
| JP | 3-97785 | 4/1991 |
| JP | 2002097212 | 4/2002 |
| JP | 2002-179712 | 6/2002 |
| JP | 2002179712 | 6/2002 |
| JP | 2002179812 | 6/2002 |

OTHER PUBLICATIONS

English Language Abstract of Japanese Patent No. JP 2002179712, Jun. 26, 2002, Asahi Denka Kogyo KK.
English Language Abstract of Japanese Patent No. JP 49049198, Dec. 25, 1974, Sanyo Chemical Industries LTD.
English Language Abstract of Japanese Patent No. JP 03 097785, Apr. 23, 1991, KOA Corp; Mitsubishi Heavy Industries.
Urquiola et al., "Emulsion Polymerization of Vinyl Acetate Using a Polymerizable Surfactant I. Kinetic Studies", J. Polymer Sci., 30(1992) pp. 2619-2629.
Urquiola et al., "Emulsion Polymerization of Vinyl Acetate Using a Polymerizable Surfactant III. Mathematical Model", J. Polymer Sci., 31(1993) pp. 1403-1415.
English Language Abstract of Japanese Patent No. JP 2002179812, Jun. 26, 2002, Mitsui Du Pont Polychemical.

*Primary Examiner*—Edward J Cain
(74) *Attorney, Agent, or Firm*—Richard P. Silverman

(57) ABSTRACT

The invention relates to copolymers of formula (I) wherein $R^1$ is hydrogen, a $C_1$-$C_5$-alkyl radical or $C_2$-$C_5$-alkenyl radical which can also contain heteroatoms, an acid group or an aliphatic or aromatic group comprising 1-50 carbon atoms, including an acid group, $R^2$ and $R^3$ independently represent hydrogen, methyl and/or ethyl, n ranges from 0-100, and m ranges from 3 to 30, and k ranges from 1-200, and A is hydrogen, an acid group, a $C_1$-$C_5$-alkyl radical or a $C_2$-$C_8$-alkenyl radical which can also contain heteroatoms, an aliphatic or aromatic group comprising 1-50 carbon atoms, including an acid group, or a copolymer unit of formula (II), wherein $R^4$ is hydrogen, a $C_1$-$C_5$-alkyl radical or a $C_2$-$C_5$-alkenyl radical which can also contain heteroatoms, an acid group or an aliphatic or aromatic group comprising 1-50 carbon atoms, including an acid group, $R^5$ is hydrogen, methyl and/or ethyl, x ranges from 0 to 100, and y ranges from 3-30, wherein, if A is formula (2), $R^1$ represents hydrogen or an acid group.

8 Claims, No Drawings

COPOLYMERS CONTAINING STYRENE OXIDE AND USE THEREOF AS EMULSIFIERS AND DISPERSING AGENTS

The present invention relates to nonionic and anionic emulsifiers for pigments, bitumen and the emulsion polymerization which contain copolymers of alkylene oxides and styrene oxide.

The emulsifiers used for dispersing bitumen and pigments or for the emulsion polymerization according to the prior art are generally anionic and nonionic emulsifiers.

Customary anionic emulsifiers are sodium, potassium and ammonium salts of fatty acids, sodium alkylbenzenesulfonates, sodium alkanesulfonates, sodium olefinsulfonates, sodium polynaphthalenesulfonates, sodium dialkyldiphenyl ether disulfonates, sodium, potassium and ammonium alkylsulfates, sodium, potassium and ammonium alkylpolyethylene glycol ether sulfates, sodium, potassium and ammonium alkylphenol polyethylene glycol ether sulfates, sodium, potassium and ammonium mono- and dialkylsulfosuccinates and monoalkyl polyoxyethylsulfosuccinates, and alkylpolyethylene glycol ether phosphoric acid mono-, di- and triesters and mixtures thereof and alkylphenol polyethylene glycol ether phosphoric acid mono-, di- and triesters and mixtures thereof, and sodium, potassium and ammonium salts thereof.

Nonionic emulsifiers usually used are alkylphenol polyethylene glycol ethers, alkylpolyethylene glycol ethers, fatty acid polyethylene glycol ethers, ethylene/propylene glycol block polymers and sorbitan ester polyethylene glycol ethers.

Very good emulsifying properties can be achieved by the use of ethylene oxide/propylene oxide polymers having nonylphenols as a hydrophobic head group. WO 00/04096 discloses the use of such nonylphenol alkoxylates as dispersing agents for bitumen emulsions. However, since the nonylphenol group has fallen into disrepute owing to its unfavorable ecotoxicological properties, alternatives for it are being sought.

EP-A-0 403 718 discloses alkyl ether styrene oxide alkoxylates having one terminal alkyl ether styrene oxide unit each on the polyalkoxylate chains.

EP-A-1 078 946 discloses $C_8$-$C_{13}$-alkyl ether styrene oxide alkoxylates.

Both applications disclose copolymers having from one to not more than two units of styrene oxide and the use thereof in unreactive/noncopolymerizable systems.

Particularly in the area of emulsion polymerization, copolymerizable emulsifiers have attracted particular interest in the recent past, i.e. those which have a double bond which can react in a free radical polymerization.

J. Polym. Sci., 30 (1992) 2619-2629 and J. Polym. Sci., 31 (1993) 1403-1415 describe, for example, the use of sodium dodecylallylsulfosuccinate as a copolymerizable emulsifier in the emulsion polymerization of vinyl acetate.

EP-A-050 166 describes aqueous polymer dispersions which were prepared by emulsion polymerization using emulsifiers capable of free radical polymerization.

EP-A-0 472 837 describes 1-propenyl alkylphenolethoxylates as emulsifiers for emulsion polymerization.

EP-A-0 464 454 describes sulfuric esters of 1-propenyl alkylphenolethoxylates as emulsifiers for emulsion polymerization.

It is therefore an object of the present invention to provide substitutes for nonylphenol alkoxylates having outstanding emulsifying and dispersing properties, which can easily be made available both in nonpolymerizable form and in polymerizable form, and whose molecular structure can be easily and flexibly adapted to the medium to be dispersed in each case.

It has now been found that outstanding dispersing properties can be achieved with copolymers of alkylene oxides and styrene oxide. In the area of pigment and bitumen dispersions, in particular unreactive copolymers having a plurality of condensed units of styrene oxide can be used. In the area of emulsion polymerization, vinyl ether or allyl ether polystyrene oxide alkoxylates can be used as copolymerizable emulsifiers.

The invention therefore relates to copolymers of the formula (1)

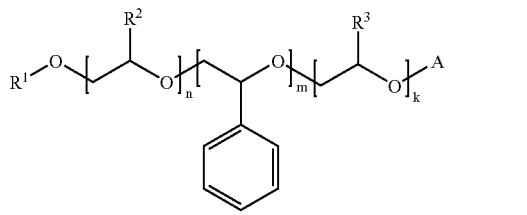

(1)

in which $R^1$ is hydrogen, a $C_1$-$C_5$-alkyl radical, or $C_2$-$C_5$-alkenyl radical which may also contain hetero atoms, an acid group or an aliphatic or aromatic group having 1 to 50 carbon atoms, which carries an acid group, $R^2$ and $R^3$ independently of one another, are hydrogen, methyl and/or ethyl, n is a number from 0 to 100, and m is a number from 3 to 30, and k is a number from 1 to 200, and A is hydrogen, an acid group, a $C_1$-$C_5$-alkyl radical or $C_2$-$C_8$-alkenyl radical which may also contain hetero atoms, an aliphatic or aromatic group having 1 to 50 carbon atoms, which carries an acid group, or a copolymer unit of the formula (2)

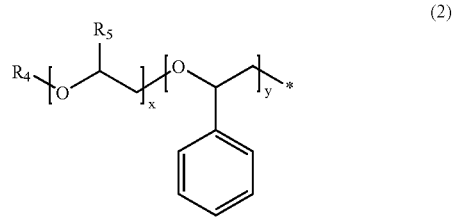

(2)

in which $R^4$ is hydrogen, a $C_1$-$C_5$-alkyl radical or $C_2$-$C_5$-alkenyl radical which may also contain hetero atoms, an acid group or an aliphatic or aromatic group having 1 to 50 carbon atoms, which carries an acid group, $R^5$ is hydrogen, methyl and/or ethyl, x is a number from 0 to 100, and y is a number from 3 to 30, where, if A corresponds to formula (2), $R^1$ is hydrogen or an acid group.

The invention furthermore relates to a process for carrying out an emulsion polymerization by adding the copolymers according to the invention to a reaction mixture to be polymerized.

The invention furthermore relates to a process for the preparation of polymer dispersions by polymerizing the copolymers according to the invention with olefinically unsaturated monomers in the aqueous phase, and the aqueous polymer dispersion which can be prepared in this manner.

The invention furthermore relates to a process for dispersing pigments or bitumen by adding the copolymers according to the invention to the pigments or to the bitumen.

The invention furthermore relates to the use of the copolymers according to the invention as emulsifiers in emulsion polymerization or as pigment and bitumen emulsifier.

If the copolymers according to the invention are used as emulsifiers in emulsion polymerization, they contain an olefinic double bond. In this case, $R^1$ or $R^4$ is a $C_2$- to $C_5$-alkenyl group, or A is an olefinically unsaturated carboxylic acid.

The repetitive structural units in formulae 1 and 2 can be arranged randomly or block by block. In a preferred embodiment of the invention, the copolymers according to the invention are those alkoxylates whose alkoxy groups are arranged block by block.

k in a preferred embodiment is a number from 10 to 100.
m in a preferred embodiment is a number from 3 to 10.
n in a preferred embodiment is a number from 1 to 5.

In a preferred embodiment of the invention, the formula 1 represents an ester or partial ester. Examples of inorganic acids which are suitable for the formation of the partial esters according to the invention and from which A, $R^4$ or $R^1$ may be derived are sulfuric acid and phosphoric acid. If phosphoric acid is used, the partial esters according to the invention may be either monoesters or diesters of phosphoric acid. If A is an acid radical, it can be bonded to the copolymer by means of a hydrocarbon group of 1 to 50 carbon atoms.

In a preferred embodiment, the organic or inorganic acids used for the esterification of the copolymers according to formula 1 are monobasic, dibasic or tribasic.

In a preferred embodiment, the organic acids are monobasic, dibasic, tribasic or polybasic carboxylic acids. Monobasic acids are preferably an unsaturated carboxylic acid, such as, for example, acrylic acid, methacrylic acid, crotonic acid, itaconic acid, maleic acid or fumaric acid. Dibasic, tribasic or polybasic carboxylic acids are compounds which contain 2, 3 or more carboxyl groups and which moreover may have at least one sulfur- or phosphorus-containing functional group. Sulfur-containing functional groups are particularly preferred, especially sulfonate groups.

The particularly preferred sulfonic acids/sulfonates may be aliphatic or aromatic compounds. Preferred sulfonic acids/sulfonates contain 2 or 3 carboxyl groups and, with inclusion of the carboxyl groups, 3 to 6 carbon atoms. A particularly preferred sulfonic acid is sulfosuccinic acid.

In a preferred embodiment, the sulfonic and carboxylic acids are aromatic or aliphatic compounds which carry one or more acid functions.

Particularly preferred esters, partial esters and acid derivatives thus correspond to the formulae (3) to (14)

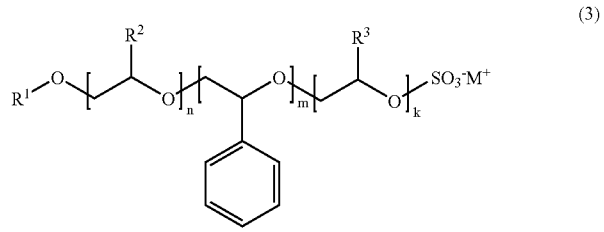

(3)

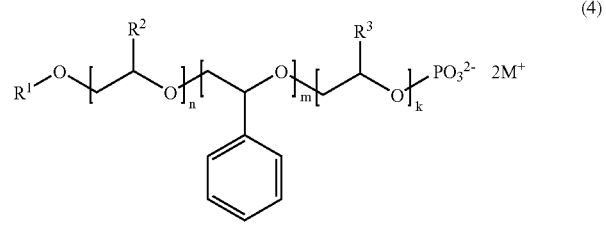

(4)

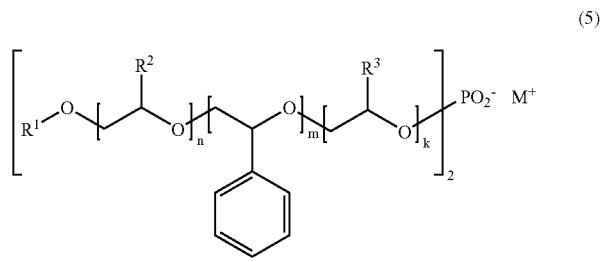

(5)

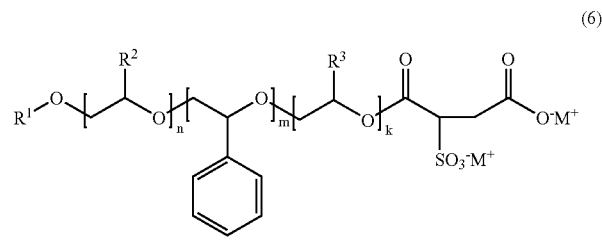

(6)

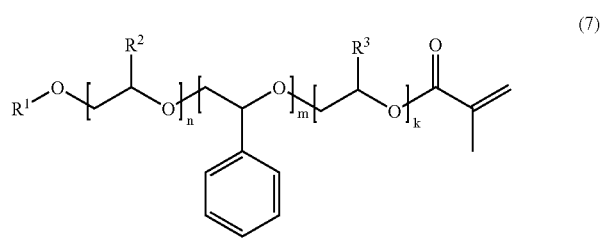

(7)

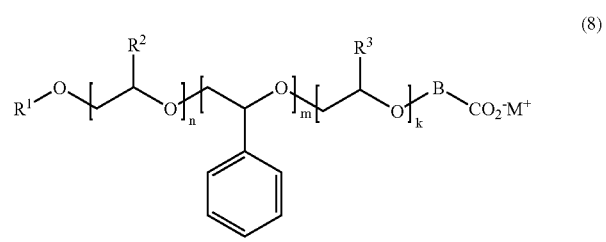

(8)

-continued
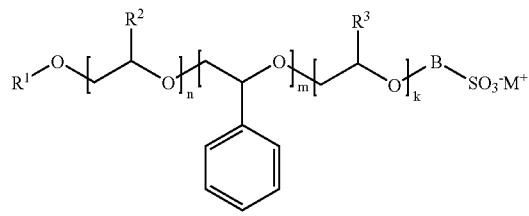
(9)
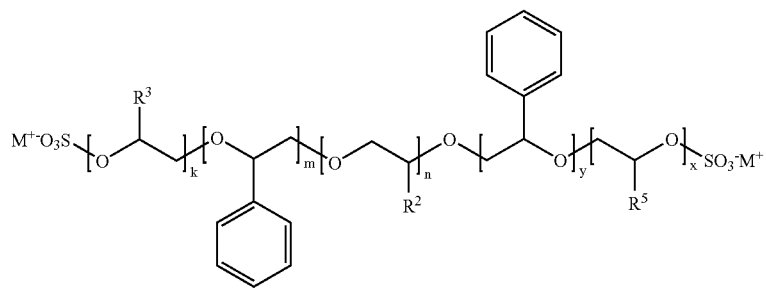
(10)
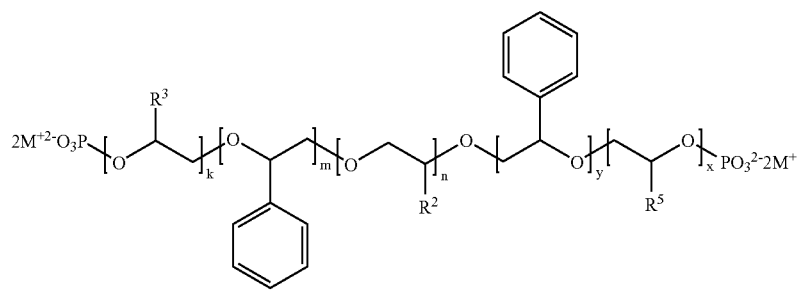
(11)
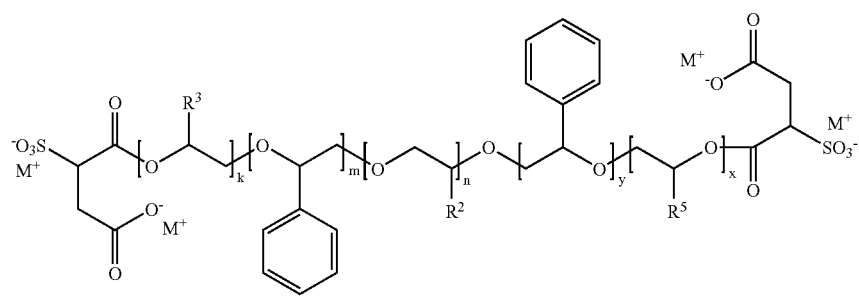
(12)
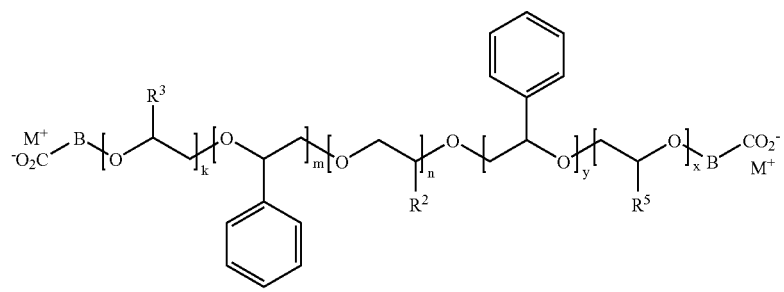
(13)

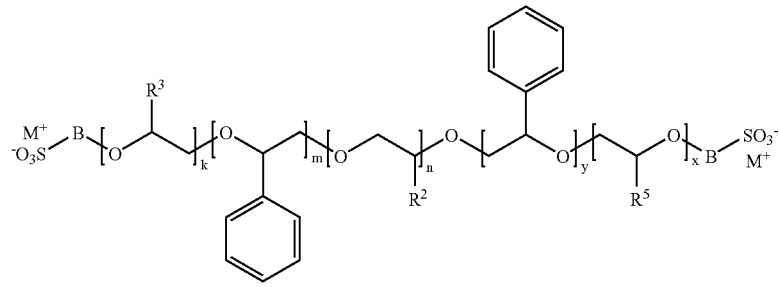

(14)

in which $R^1$, $R^2$, $R^3$, $R^5$, m, k, x, y and n have the abovementioned meanings, M is an alkali metal ion, an ammonium ion or $H^+$ and B is an aliphatic or aromatic group having 1 to 50 carbon atoms, which may also contain hetero atoms.

The partial esters according to the invention can be prepared by reacting the copolymers of the formula 1 with suitable acids. However, it should be ensured that the acids do not have an oxidizing effect, since otherwise oxidation of the double bond may take place. For this reason, the preparation of a sulfate partial ester is preferably carried out using amidosulfonic acid instead of sulfuric acid. The ammonium salts thus obtained can be converted into the corresponding alkali metal salts by reaction with alkali metal hydroxides. For the preparation of partial esters of phosphoric acid, phosphoric acid can be used. Organic acids can be reacted directly, as esters or in the form of anhydrides, with the copolymers of the formula 1. The introduction of functional groups is preferably effected after the preparation of the partial ester of the unfunctionalized acids. Thus, the preparation of methacrylic esters, for example of those according to formula 7, can be effected by direct esterification or transesterification with methacrylic acid or methyl methacrylate, and the preparation of sulfosuccinic esters, for example of those according to formula 5, can be effected by preparation of the corresponding maleic esters and subsequent sulfonation, e.g. with pyrosulfites.

The preparation of the sulfonic acids, carboxylic acids and phosphonic acids is effected by reacting the copolymers of the formula 1 with the corresponding alkanols, halides or cyclic esters of the sulfonic or carboxylic acids.

The copolymers according to the invention are suitable as copolymerizable emulsfiers in emulsion polymerization if they contain groups capable of free radical polymerization, i.e. preferably olefinically unsaturated groups. When used as emulsifiers in emulsion polymerization, the copolymers according to the invention are polymerized with further monomers, from which it is intended to prepare a polymer dispersion. Unsaturated monomers are suitable for the preparation of polymer dispersions. Examples of preferred olefinically unsaturated monomers are vinyl monomers, such as carboxylic esters of vinyl alcohol, for example vinyl acetate or vinyl propionate, vinyl ethers of isononanoic acid or of isodecanoic acid, aryl-substituted olefins, such as styrene and stilbene, olefinically unsaturated carboxylic esters, such as methyl acrylate, ethyl acrylate, propyl acrylate, n-butyl acrylate, isobutyl acrylate, pentyl acrylate, hexyl acrylate, 2-ethylhexyl acrylate, hydroxyethyl acrylate and the corresponding methacrylic esters, olefinically unsaturated dicarboxylic esters, such as dimethyl maleate, diethyl maleate, dipropyl maleate, dibutyl maleate, dopentyl maleate, dihexyl maleate and di-2-ethylhexyl maleate, olefinically unsaturated carboxylic acids and dicarboxylic acids, such as acrylic acid, methacrylic acid, itaconic acid, maleic acid and fumaric acid and their sodium, potassium and ammonium salts, olefinically unsaturated sulfonic acids and phosphonic acids and their alkali metal and ammonium salts, such as acrylamidomethylpropanesulfonic acid and its alkali metal and ammonium, alkylammonium and hydroxyalkylammonium salts, allylsulfonic acid and its alkali metal and ammonium salts, acryloyloxyethylphosphonic acid and its ammonium and alkali metal salts and the corresponding methacrylic acid derivatives, olefinically unsaturated amines, ammonium salts, nitriles and amides, such as dimethylaminoethyl acrylate, acryloyloxyethyltrimethylammonium halides, acrylonitrile, N-methylacrylamide, N-ethylacrylamide, N-propylacrylamide, N-methylolacrylamide and the corresponding methacrylic acid derivatives and vinylmethylacetamide.

In a preferred embodiment, the abovementioned monomers are polymerized with further comonomers, preferably olefins or halogenated olefins having 2 to 8 carbon atoms, such as, for example, ethylene, propene, butenes, pentenes, 1,3-butadiene, chloroprene, vinyl chloride, vinylidene chloride, vinylidene fluoride and tetrafluoroethylene.

For the preparation of the polymer dispersions, the water-immiscible monomers are generally finely distributed with the aid of the copolymers according to the invention in the aqueous phase in the form of micelles, and the free radical polymerization reaction is initiated by initiators such as, for example, ammonium, sodium and potassium peroxodisulfate.

Further auxiliaries and additives for use with the copolymers according to the invention may be protective colloids, such as carboxymethylcellulose, hydroxyethylcellulose, methylhydroxypropylcellulose and partly and completely hydrolyzed polyvinyl alcohol.

An overview of customary processes, surfactants and further auxiliaries of emulsion polymerization is given by Peter A. Lovell and Mohamed S. El-Aasser, in "Emulsion Polymerization and Emulsion Polymers", published by John Wiley & Sons, 1997.

The copolymers according to the invention are initially introduced into the reaction vessel before the beginning of the polymerization reaction or are added to the polymerization vessel during the polymerization reaction.

In general, the copolymers according to the invention are used as emulsifiers in amounts of from 0.1 to 50, preferably from 0.2 to 10, in particular from 0.4 to 4% by weight, based on the weight of the olefinically unsaturated monomers which are insoluble or slightly soluble in water and used for the preparation of the polymer dispersion.

The copolymers according to the invention may be used both alone and in combination with other already known anionic and nonionic emulsifiers of the prior art, as described at the outset. The amount of the anionic and nonionic emulsifiers of the prior art is then preferably from 0.001 to 5, in particular from 0.01 to 1% and particularly preferably from 0.02 to 0.4% by weight, based on the weight of the olefinically unsaturated monomers which are insoluble or slightly soluble in water.

The polymer dispersions prepared using the copolymers according to the invention exhibit little coagulum formation during and after the polymerization and an improvement in the shear, heat and storage stability, in the freezing/thawing stability and in the electrolyte stability compared with divalent and trivalent cations, such as calcium, barium and aluminum. Furthermore, an improvement of the film properties of the polymer films produced from the polymer dispersions is observable. The polymer dispersions prepared using the copolymers according to the invention form films having low water absorption, little tarnishing on contact with water, a small contact angle relative to water and good wet and dry rub fastnesses.

EXAMPLES

Preparation of Copolymers of Alkylene Oxides and Styrene Oxide

Example 1

Allyl Alcohol-initiated Ethylene Oxide/Styrene Oxide Copolymer, MW about 1300 g/mol 1 mol of allyl alcohol was partially reacted with 0.1 mol of sodium methanolate in a laboratory autoclave to give the alcoholate. Methanol was distilled off. 4 mol of styrene oxide were added dropwise and stirring was effected for 15 hours at 90° C. 20 mol of ethylene oxide were then added to the reaction product at 140° C. After the ethylene oxide had completely reacted, the product was analyzed by means of NMR spectroscopy and determination of OH number.

The OH number was 42 mg KOH/g.

The NMR spectrum corresponded to the following structure:

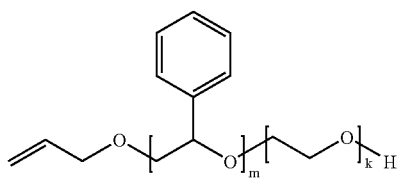

where m=3.8 and k=19, i.e. the ratio of the aromatic protons to the alkenyl and $CH_2$—OH and the chain $CH_2$—$CH_2$—O protons was 19:3:2:76.

Example 2

Methyldiglycol-initiated Styrene Oxide/Ethylene Oxide Copolymer 1 mol of methyldiglycol was partially reacted with 0.1 mol of potassium methanolate in a laboratory autoclave to give the alcoholate. Methanol was distilled off. 4 mol of styrene oxide were then added dropwise and polymerization was effected for 5 hours at about 140° C. under pressure. 40 mol of ethylene oxide were added to this reaction product at 140° C. After the ethylene oxide had completely reacted, the product was analyzed by means of NMR spectroscopy and determination of OH number.

The OH number was 27.9 mg KOH/g.

The NMR spectrum corresponded to the following structure:

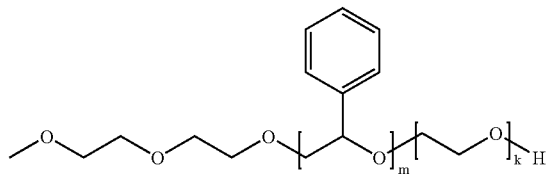

where m=3.8 and k=39, i.e. the ratio of the aromatic protons to the $CH_3$, the $CH_2$—OH and the chain $CH_2$—$CH_2$—O protons was 19:3:2:156.

Example 3

Monoethylene Glycol-initiated Styrene Oxide/Propylene Oxide Copolymer 1 mol of monoethylene glycol was partially reacted with 0.1 mol of potassium methanolate in a laboratory autoclave to give the alcoholate. Methanol was distilled off. 10 mol of styrene oxide were then added and polymerization was effected for 5 hours at about 100° C. under pressure. 20 mol of propylene oxide were added dropwise to this reaction product, and polymerization was effected again for 9 hours at 130° C. under pressure. After the propylene oxide had completely reacted, the product was analyzed by means of NMR spectroscopy and determination of OH number.

The OH number was 54 mg KOH/g, corresponding to an average molar mass of 2080 g/mol, assuming 2 free OH groups per molecule. The NMR spectrum showed a ratio of CHOH:aromatic styryl:$CH_3$-propyl protons of 1:23:28, corresponding to the following structure where m=2.3 and k=9.3:

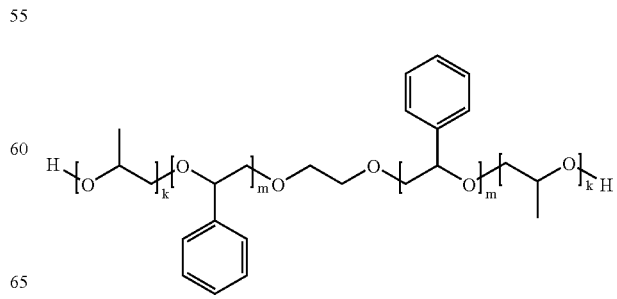

Example 4

Hydroxybutylvinyl-initiated Ethylene Oxide/Styrene Oxide Copolymer, MW 2600 g/mol

1 mol of hydroxybutylvinyl ether was partially reacted with 0.1 mol of potassium methanolate in an inert solvent (monoglyme) in a laboratory autoclave to give the alcoholate. Methanol was distilled off. Thereafter, 5 mol of styrene oxide were added and polymerization was effected for 5 hours at about 100° C. 40 mol of ethylene oxide at 140° C. were added to this reaction product under pressure at 140° C. After the ethylene oxide had completely reacted, the product was analyzed by means of NMR spectroscopy and determination of OH number.

The OH number was 24 mg KOH/g.

The NMR spectrum corresponded to the following structure:

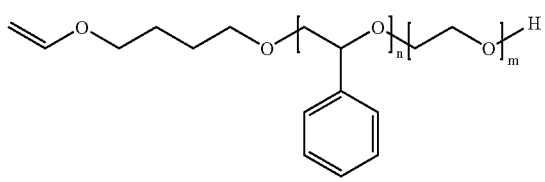

where n=4.8 and m=38.

Preparation of Esters and Partial Esters

EXAMPLES

Example 5

11.4 g of amidosulfonic acid and 0.5 g of 50% strength hypophosphorous acid were added to 150 g of the copolymer from example 1 under nitrogen. The mixture was heated to 80° C. for 5 h and to 100° C. for 1 h with thorough stirring. After the end of the reaction, the mixture was allowed to cool, and 1.6 g of 20% strength NaOH were added. 158 g (98%) of the sulfuric monoester were obtained.

Example 6

46.6 g of amidosulfonic acid and 0.8 g of urea were added to 500 g of the copolymer from example 3 under nitrogen and the mixture was stirred thoroughly for 3 h at 100° C. After the end of the reaction, the mixture was allowed to cool and 1.5 g of 20% strength NaOH were added. 535 g (98%) of the sulfuric ester were obtained.

Example 7

200 g of the ammonium salt of the sulfuric monoester prepared in example 5 were heated to 60° C. At 200 mbar, 32 g of 18% strength NaOH were added dropwise and then reacted for a further 2 h at 50 mbar, the water introduced being expelled together with the ammonia. 196 g (98%) of the sodium salt of the sulfuric monoester were obtained.

Example 8

24 g of amidosulfonic acid and 0.7 g of urea were added to 500 g of the copolymer from example 2 under nitrogen and the mixture was thoroughly stirred for 8 h at 120° C. After the end of the reaction, the mixture was allowed to cool, and 1.2 g of 20% strength NaOH were added. 51 g (99%) of the sulfuric monoester were obtained.

Example 9

2010 g of the copolymer from example 3 were added dropwise to 98 g of maleic anhydride at 70° C. under nitrogen. The mixture was then heated to 90° C. for 4 h and added to a mixture of 52 g of sodium pyrosulfite, 40 g of NaOH and 2270 g of distilled water and reacted for 5 h at 80° C. 4470 g of sulfosuccinate solution having a content of 50% by weight were obtained.

Example 10

600 g of the copolymer from example 2 were heated to 100 to 150° C. with 50 g of methacrylic acid, 5 g of sulfuric acid and 0.3 g of phenothiazine. During this procedure, the pressure was slowly reduced to 50 mbar and the water of reaction was distilled off. After 12 hours, the reaction was complete. 595 g (95%) of the corresponding methacrylic ester were obtained.

Example 11

113 g of polyphosphoric acid were added to 1260 g of the copolymer from example 1 at 70° C. and the mixture was stirred for 2 h at 70° C. After a further 2 h at 100° C., 30 g of water were added at 90° C. and stirring was effected for a further 2 h. 1400 g of product were obtained, said product being a mixture of 82% by weight of phosphoric monoester and 8% by weight of phosphoric diester, and the remainder being water. The product contained no phosphoric triester.

Preparation of Sulfonic Acids

EXAMPLES

Example 12

174 g of 4-hydroxybenzenesulfonic acid sodium salt dihydrate and 30 g of NaOH prills were added to 946 g of copolymer from example 1 under nitrogen at 50° C. and the mixture was stirred for 1 h. The mixture was then stirred for a further 2 h at 70° C. The lower phase was discarded and the upper phase was neutralized with 7 g of acetic acid. 1025 g (95%) of the desired sulfonic acid ether were obtained.

Example 13

11 g of sodium hydroxide prills were added to 650 g of the alcohol from example 4 and drying was effected for 2 hours at 100° C. in vacuo. Thereafter, 0.25 mol (34 g) of butane sulfone was added dropwise under nitrogen at 90° C. and stirring was effected for 6 hours. The α-vinyloxy-Ω-sulfonate/ethylene oxide/styrene oxide block copolymer was obtainable in a 70% yield according to NMR analysis.

The NMR spectrum corresponded to the following structure:

$$\text{CH}_2=\text{CH}-\text{O}-(\text{CH}_2)_4-\text{O}-[\text{CH}(\text{C}_6\text{H}_5)-\text{CH}_2-\text{O}]_n-[\text{CH}_2\text{CH}_2\text{O}]_m-(\text{CH}_2)_4-\text{SO}_3\text{Na}$$

Preparation of Carboxylic Acids

EXAMPLES

Example 14

59 g of chloroacetic acid sodium salt and 20 g of NaOH prills were added to 630 g of the copolymer from example 1 under nitrogen at 50° C. and the mixture was stirred for 3 h. The mixture was then stirred for a further 4 h at 70° C. The lower phase was discarded and the upper phase was neutralized with 6 g of acetic acid. 650 g (97%) of the desired carboxylic acid ether were obtained.

Example 15

120 g of 4-hydroxybenzoic acid sodium salt and 30 g of NaOH prills were added to 1505 g of copolymer from example 2 under nitrogen at 50° C. and the mixture was stirred for 1 h. The mixture was then stirred for a further 2 h at 80° C. The lower phase was discarded and the upper phase was neutralized with 10 g of acetic acid. 1525 g (95%) of the desired carboxylic acid ether were obtained.

Preparation of Polymer Dispersions

Example 16

Styrene/Acrylate Dispersion 1020 g of a monomer emulsion consisting of 330.4 g of demineralized water, 8.8 g of ®Emulsogen EPA 073 (sodium alkylpolyethylene glycol ether sulfate, Clariant GmbH), 10.6 g of the sulfonic acid ether according to the invention and from example 11, 3.6 of sodium bicarbonate, 216 g of styrene, 300 g of n-butyl acrylate, 144 g of methyl methacrylate and 6.6 g of methacrylic acid and an initiator solution consisting of 3.33 g of ammonium peroxodisulfate and 85.5 ml of demineralized water were prepared.

189.1 g of demineralized water were initially introduced into a 2 liter reaction vessel and 22 g of Emulsogen EPA 073 were added. The emulsifier solution in the reaction vessel was heated to 80° C. under a nitrogen atmosphere and while stirring with an anchor stirrer. 22.2 ml of initiator solution and 25.5 ml of the monomer emulsion were then added. The free radical polyaddition reaction begins. By means of a water bath, the reaction mixture was cooled and was kept constant at 79-81° C. The remaining 994.5 g of the monomer emulsion and 66.6 g of the initiator solution were added over a period of 3 hours. Thereafter, the reaction mixture was kept at 80° C. for a further hour by means of the water bath and was then cooled to room temperature. The pH of the prepared polymer dispersion was adjusted to pH 7-8 with 12.5% strength ammonia solution.

The resulting polymer dispersion has a solids content of 52% and a coagulum content of <0.05% over a 100 μm sieve and of <0.07% over a 40 μm sieve, based on the dispersion.

Example 17

Styrene/Acrylate Dispersion

The procedure was as in example 15. Instead of 10.6 g of the sulfonic acid ether according to the invention and from example 11, 10.6 g of the α-vinyloxy-Ω-sulfonate/ethylene oxide/styrene oxide block copolymer according to the invention and from example 12 were used.

The resulting polymer dispersion has a solids content of 52% and a coagulum content of <0.05% over a 100 μm sieve and of <0.07% over a 40 μm sieve, based on the dispersion.

Example 18

Styrene/Acrylate Dispersion 1020 g of a monomer emulsion consisting of 332.2 g of demineralized water, 4.4 g of Emulsogen EPA 073, 13.2 g of the reactive, nonionic emulsifier according to the invention and from example 4, 3.6 g of sodium bicarbonate, 216 g of styrene, 300 g of n-butyl acrylate, 144 g of methyl methacrylate and 6.6 g of methacrylic acid and an initiator solution consisting of 3.33 g of ammonium peroxodisulfate and 85.5 ml of demineralized water were prepared.

193.6 g of demineralized water were initially introduced into a 2 liter reaction vessel, and 17.6 g of Emulsogen EPA 073 were added. The further procedure was as in example 15.

The resulting polymer dispersion has a solids content of 52% and a coagulum content of <0.05% over a 100 μm sieve and of <0.1% over a 40 μm sieve, based on the dispersion.

Example 19

Styrene/Acrylate Dispersion

The procedure was as in example 17. Instead of 13.2 g of the reactive, nonionic emulsifier according to the invention and from example 4, 13.2 g of the reactive, nonionic emulsifier according to the invention and from example 1 were used.

The resulting polymer dispersion has a solids content of 52% and a coagulum content of <0.05% over a 100 μm sieve and of <0.1% over a 40 μm sieve, based on the dispersion.

Example 20

Pure Acrylate Dispersion 1120 g of a monomer emulsion consisting of 247.3 g of demineralized water, 5.98 g of Emulsogen EPA 073, 16.8 g of the sulfonic acid ether according to the invention and from example 11, 1.37 g of dodecyl mercaptan, 93.4 g of methyl methacrylate, 217.9 g of 2-ethylhexyl acrylate, 529.2 g of n-butyl acrylate and 8.72 g of methacrylic acid and 35.5 g of an initiator solution consisting of 4.44 g of ammonium peroxodisulfate and 31.06 g of demineralized water were prepared.

163.9 g of demineralized water were initially introduced into a 2 liter reaction vessel and heated to 80° C. over a water bath under a nitrogen atmosphere. Thereafter, 10.58 g of the initiator solution were added and the continuous addition of 1120 g of monomer emulsion and of the remaining 35.5 g of initiator solution was immediately begun. The metering of the two components was effected with continuous stirring with an anchor stirrer and under a nitrogen atmosphere within a period of 3 hours. Thereafter, the reaction mixture was thermostated at 80° C. for a further hour and then cooled to room temperature. The pH of the prepared polymer dispersion was adjusted to pH 7-8 with 12.5% strength ammonia solution.

The resulting polymer dispersion had a solids content of 65% and a coagulum content of <0.05% over a 100 μm sieve and of <0.1% over a 40 μm sieve, based on the dispersion.

Example 21

Pure Acrylate Dispersion 1120 g of a monomer emulsion consisting of 247.3 g of demineralized water, 5.98 g of Emulsogen EPA 073, 16.81 g of the α-vinyloxy-Ω-sulfonate/ethylene oxide/styrene oxide block copolymer according to the invention and from example 12, 1.37 g of dodecyl mercaptan, 93.4 g of methyl methacrylate, 217.9 g of 2-ethylhexyl acrylate, 529.2 g of n-butyl acrylate and 8.72 g of methacrylic acid and 35.5 g of an initiator solution consisting of 4.44 g of ammonium peroxodisulfate and 31.06 g of demineralized water were prepared.

163.9 g of demineralized water were initially introduced into a 2 liter reaction vessel and heated to 80° C. over a water bath under a nitrogen atmosphere. The further procedure was as in example 19.

The resulting polymer dispersion had a solids content of 65% and a coagulum content of <0.05% over a 100 μm sieve and of <0.1% over a 40 μm sieve, based on the dispersion.

Example 22

Pure Acrylate Dispersion 1120 g of a monomer emulsion consisting of 251.3 g of demineralized water, 18.8 g of the sulfuric monoester according to the invention and from example 8, 1.37 g of dodecyl mercaptan, 93.4 g of methyl methacrylate, 217.9 g of 2-ethylhexyl acrylate, 529.2 g of n-butyl acrylate and 8.72 g of methacrylic acid and 35.5 g of an initiator solution consisting of 4.44 g of ammonium peroxodisulfate and 31.06 g of demineralized water were prepared.

163.9 g of demineralized water were initially introduced into a 2 liter reaction vessel and heated to 80° C. over a water bath under a nitrogen atmosphere. The further procedure was as in example 19.

The resulting polymer dispersion had a solids content of 65% and a coagulum content of <0.05% over a 100 μm sieve and of <0.1% over a 40 μm sieve, based on the dispersion.

The invention claimed is:

1. A method for emulsion polymerization, said method comprising adding a copolymer of the formula (1)

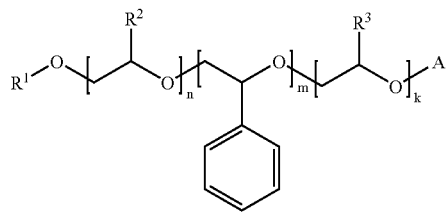

(1)

in which
R$^1$ is hydrogen, a C$_1$-C$_5$-alkyl radical, or C$_2$-C$_5$-alkenyl radical which may also contain hetero atoms, an acid group or an aliphatic or aromatic group having 1 to 50 carbon atoms, including an acid group,
R$^2$ and R$^3$, independently of one another, are hydrogen, methyl and/or ethyl,
n is a number from 0 to 100, and
m is a number from 3 to 30, and
k is a number from 1 to 200, and
A is a copolymer unit of the formula (2)

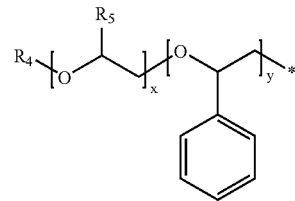

(2)

in which
R$^4$ is hydrogen, a C$_1$-C$_5$-alkyl radical or C$_2$-C$_5$-alkenyl radical which may also contain hetero atoms, an acid group or an aliphatic or aromatic group having 1 to 50 carbon atoms, including an acid group,
R$^5$ is hydrogen, methyl and/or ethyl,
x is a number from 0 to 100, and
y is a number from 3 to 30,
where R$^1$ is hydrogen or an acid group,
via the valence denoted by "*",
to a polymer reaction mixture and polymerizing said mixture.

2. The method of claim 1, wherein the alkoxy groups are arranged block by block.

3. The method of claim 1, wherein k is a number from 10 to 100.

4. The method of claim 1, wherein m is a number from 3 to 10.

5. The method of claim 1, wherein n is a number from 1 to 5.

6. The method of claim 1, wherein formula 1 represents an ester or partial ester.

7. The method of claim 1, wherein R$^1$ or R$^4$ is a C$_2$- to C$_5$-alkenyl group.

8. The method of claim 1, further comprising admixing a pigment or a bitumen with the copolymer prior to said polymerization to emulsify said pigment or bitumen.

* * * * *

UNITED STATES PATENT AND TRADEMARK OFFICE
CERTIFICATE OF CORRECTION

PATENT NO.         : 7,462,660 B2                                              Page 1 of 1
APPLICATION NO. : 10/535020
DATED               : December 9, 2008
INVENTOR(S)       : Klaus Poellmann et al.

It is certified that error appears in the above-identified patent and that said Letters Patent is hereby corrected as shown below:

Title Page, Item (73) Assignee should read
(73) Assignee: Clariant Produkte (Deutschland) GmbH, Sulzbach (DE)

Signed and Sealed this

Seventeenth Day of February, 2009

JOHN DOLL
*Acting Director of the United States Patent and Trademark Office*